United States Patent
Sato et al.

(10) Patent No.: US 11,233,391 B2
(45) Date of Patent: Jan. 25, 2022

(54) DC INTERRUPTING DEVICE

(71) Applicant: Mitsubishi Electric Corporation, Chiyoda-ku (JP)

(72) Inventors: Motohiro Sato, Chiyoda-ku (JP); Katsuhiko Horinouchi, Chiyoda-ku (JP); Sho Tokoyoda, Chiyoda-ku (JP); Takashi Inagaki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/753,401

(22) PCT Filed: Nov. 9, 2017

(86) PCT No.: PCT/JP2017/040461
§ 371 (c)(1),
(2) Date: Apr. 3, 2020

(87) PCT Pub. No.: WO2019/092834
PCT Pub. Date: May 16, 2019

(65) Prior Publication Data
US 2020/0287380 A1  Sep. 10, 2020

(51) Int. Cl.
*H02H 9/02* (2006.01)
*H01H 71/10* (2006.01)
(Continued)

(52) U.S. Cl.
CPC ............... *H02H 9/02* (2013.01); *H01H 71/10* (2013.01); *H02H 9/005* (2013.01); *H01H 9/541* (2013.01);
(Continued)

(58) Field of Classification Search
CPC ............ H02H 9/02; H02H 9/00; H02H 9/005; H02H 3/021; H02H 3/087; H02H 3/08;
(Continued)

(56) References Cited

U.S. PATENT DOCUMENTS 6,075,684 A * 6/2000 Duba ............... H03K 17/08142
361/4
8,867,180 B2 * 10/2014 LePort .................. B60L 3/0046
361/23

(Continued)

FOREIGN PATENT DOCUMENTS

EP       2846342 A1    3/2015
JP      57-119420 A    7/1982
(Continued)

OTHER PUBLICATIONS

International Search Report dated Feb. 6, 2018 in PCT/JP2017/040461 filed Nov. 9, 2017.

(Continued)

*Primary Examiner* — Danny Nguyen
(74) *Attorney, Agent, or Firm* — Xsensus LLP

(57) ABSTRACT

In order to provide a DC interrupting device that does not easily cause erroneous melting of current-limiting fuses at normal times with no fault current, and that can also deliver good current-limiting performance at the time of occurrence of fault current, the DC interrupting device includes: a (k−1)th current path including a (k−1)th current-limiting fuse, where k is an integer of not less than two and not more than N, and N is an integer of not less than two; and a kth current path connected in parallel to the (k−1)th current path and including a kth current-limiting fuse. The inductance value of the inductance component of the kth current path is higher than the inductance value of the inductance component of the (k−1)th current path.

10 Claims, 6 Drawing Sheets

(51) Int. Cl.
*H02H 9/00* (2006.01)
*H02H 3/02* (2006.01)
*H02H 3/08* (2006.01)
*H01H 9/54* (2006.01)
*H01H 33/59* (2006.01)

(52) U.S. Cl.
CPC ........... *H01H 33/596* (2013.01); *H02H 3/021* (2013.01); *H02H 3/08* (2013.01); *H02H 9/00* (2013.01)

(58) Field of Classification Search
CPC ........ H02H 3/20; H01H 71/10; H01H 33/596; H01H 9/56; H01H 9/541
USPC ........................................ 361/2–13, 117–120
See application file for complete search history.

(56) References Cited

U.S. PATENT DOCUMENTS

| | | | | |
|---|---|---|---|---|
| 2008/0303343 | A1* | 12/2008 | Yamashita | H04B 3/548 307/3 |
| 2012/0032762 | A1* | 2/2012 | Lescale | H01H 33/02 335/11 |
| 2015/0002977 | A1* | 1/2015 | Dupraz | H01H 9/542 361/115 |
| 2015/0222111 | A1* | 8/2015 | Magnusson | H01H 33/006 361/91.5 |
| 2016/0105014 | A1 | 4/2016 | Lee et al. | |

FOREIGN PATENT DOCUMENTS

| | | |
|---|---|---|
| JP | 62-82538 U | 5/1987 |
| JP | H05-236646 A | 9/1993 |
| JP | H11-273905 A | 10/1999 |
| JP | 2008-59967 A | 3/2008 |
| JP | 5214066 B1 | 6/2013 |
| JP | 2016-81923 A | 5/2016 |
| WO | 2013/164875 A1 | 11/2013 |

OTHER PUBLICATIONS

Extended European search report dated Oct. 19, 2020, in corresponding European patent Application No. 17931794.6, 7 pages.
Office Action dated Jun. 15, 2021, in corresponding Japanese patent Application No. 2019-551825, 9 pages.

* cited by examiner (a)

(b)

DC INTERRUPTING DEVICE

TECHNICAL FIELD

The present invention relates to a DC interrupting device that interrupts a direct current.

BACKGROUND ART

When a fault current flows in a power distribution grid (hereinafter referred to as a "power grid"), the failure site needs to be immediately disconnected from the power grid for protecting the power grid and the devices connected to the power grid. For interrupting the fault current, a circuit breaker is used that includes a pair of contacts and interrupts the fault current by opening the contacts.

When the electrodes are opened while a current is flowing, the circuit breaker, though supposed to interrupt the current by opening the electrodes, may fail to interrupt the current due to continuation of current caused by an arc discharge generated between the electrodes. In order to interrupt the current, an instant with a current value of zero (i.e., current zero) is required. Unlike the case with an alternating current, interruption of a direct current requires a forced current zero.

For example, a current-limiting fuse is used as a device that produces a current zero for a direct current. The current-limiting fuse is melted by a current. Specifically, a metallic fusible portion (called a "fuse element") of the current-limiting fuse generates heat and melts due to a current. This causes a voltage drop by equal to or more than the power-supply voltage between the terminals of the current-limiting fuse, thereby reducing the current and producing a current zero.

A current-limiting fuse having a good current-limiting performance refers to a current-limiting fuse that takes a short time period before the start of current limiting after the occurrence of fault current, takes a short time period before the production of current zero after the occurrence of fault current, and has a current value limited to a low level at a maximum after the occurrence of fault current. A current-limiting fuse having a smaller fuse-element wire diameter requires a shorter time period for melting, and thus delivers better current-limiting performance.

On the other hand, a current-limiting fuse having a smaller fuse-element wire diameter is subject to erroneous melting when a fault current does not flow (hereinafter referred to as "normal times"). A current exceeding the rated current flowing at normal times may deteriorate the current-limiting fuse. In order to suppress such deterioration, a plurality of current-limiting fuses may be connected in parallel so as to reduce the current that flows through each current-limiting fuse.

However, with a DC circuit breaker having a plurality of current-limiting fuses connected in parallel, only a low current flows through each current-limiting fuse when a fault current occurs. Thus, a long period of time is required before the melting of the fuse elements after the occurrence of the fault current. That is, the DC circuit breaker delivers lower current-limiting performance.

In an interrupting device disclosed in PTL 1, a commutation switch and a disconnecting switch are connected to in series. Further, a current-limiting element is connected in parallel to the commutation switch. At normal times, a current in the interrupting device passes through the commutation and disconnecting switches in a closed state.

When an overcurrent is generated in the interrupting device disclosed in PTL 1, the commutation switch opens, so that the overcurrent flows through the current-limiting element connected in parallel to the commutation switch. Then, the overcurrent is limited by the resistance or reactor of the current-limiting element. Further, the limited overcurrent is interrupted by the disconnecting switch.

CITATION LIST

Patent Literature

PTL 1: Japanese Utility Model Laying-Open No. 62-82538

SUMMARY OF INVENTION

Technical Problem

In the interrupting device of PTL 1, the current-limiting element, when melted, has a high voltage across the current-limiting element. Accordingly, an electric arc may be generated in the commutation switch, which may allow the current to continue and prevent satisfactory current limiting.

The present invention has been made to solve the above-described problems of interrupting devices. An object of the present invention is to provide a DC interrupting device that does not easily cause erroneous melting of current-limiting fuses at normal times, and that can also deliver good current-limiting performance at the time of occurrence of fault current.

Solution to Problem

A DC interrupting device in the present invention includes a (k−1)th current path including a (k−1)th current-limiting fuse, where k is an integer of not less than two and not more than N, and N is an integer of not less than two. The DC interrupting device further includes a kth current path connected in parallel to the (k−1)th current path and including a kth current-limiting fuse. The inductance value of the inductance component of the kth current path is higher than the inductance value of the inductance component of the (k−1)th current path.

Advantageous Effects of Invention

The present invention provides a DC interrupting device that does not easily cause erroneous melting of current-limiting fuses at normal times with no fault current, and that can also deliver good current-limiting performance at the time of occurrence of fault current.

DESCRIPTION OF EMBODIMENTS

Embodiments for carrying out the present invention will now be described in detail with reference to the drawings. The embodiments shown below are by way of example and are not to be construed as limiting the present invention.

Embodiment 1

Figure 1:
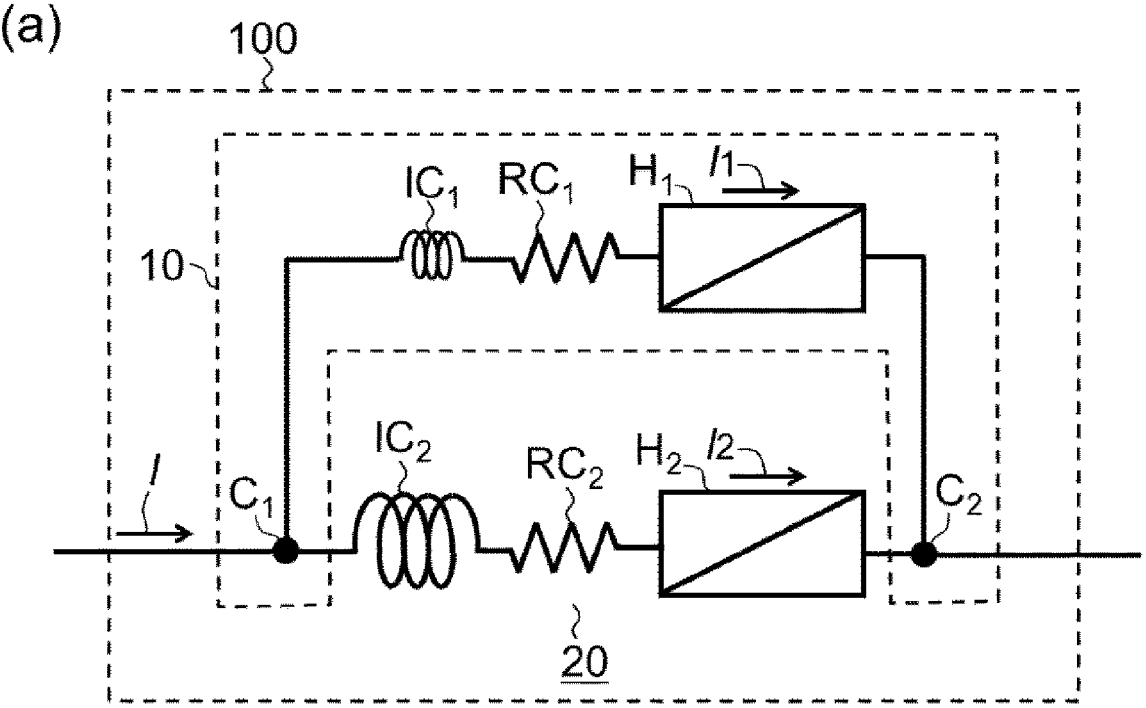
FIG. 1 shows a configuration of a DC interrupting device in embodiment 1 of the present invention.
Figure 1:
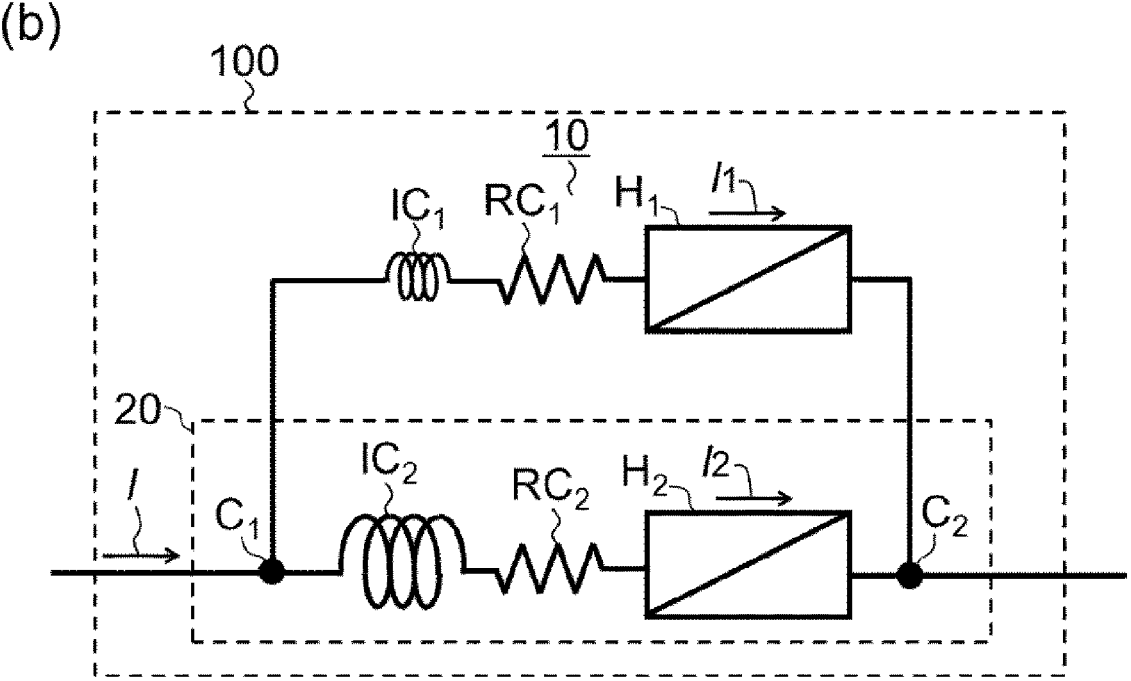

FIG. 1 shows a configuration of a DC interrupting device in embodiment 1 of the present invention. FIG. 1(a) and FIG. 1(b) both show a DC interrupting device 100. In order to clearly show the ranges of current paths 10 and 20, current paths 10 and 20 are enclosed by dashed lines in FIG. 1(a) and FIG. 1(b), respectively.

DC interrupting device 100 includes current path 10, and current path 20 connected in parallel to current path 10 at connection points $C_1$ and $C_2$. An inductance component $IC_1$ and a resistance component $RC_1$ are respectively the inductance and the resistance component of the entire current path 10. DC interrupting device 100 has terminals, one or both of which are connected to a power grid (not shown).

While DC interrupting device 100 is configured so that the first and second current paths are connected at connection points $C_1$ and $C_2$, this is not a limitation. The advantageous effects of the present invention can be obtained if the first and second current paths are connected in parallel and the relation of inductance components and the relation of resistance components between the current paths are defined as in DC interrupting device 100.

Current path 10 includes a current-limiting fuse $H_1$. The current through current path 10 is denoted by current $I_1$. Inductance component $IC_2$ and resistance component $RC_2$ are respectively the inductance and the resistance of the entire current path 20. Current path 20 includes a current-limiting fuse $H_2$.

The current through current path 20 is denoted by current $I_2$. The current through the entire DC interrupting device 100 is denoted by total current I. All the currents flow from connection point $C_1$ to connection point $C_2$.

The value of inductance component $IC_1$ and the value of resistance component $RC_1$ are respectively denoted by inductance value $L_1$ and resistance value $R_1$. The value of inductance component $IC_2$ and the value of resistance component $RC_2$ are respectively denoted by inductance value $L_2$ and resistance value $R_2$. Inductance value $L_2$ is higher than inductance value $L_1$. Resistance value $R_1$ and resistance value $R_2$ are equal.

Inductance values $L_1$ and $L_2$ can be adjusted by providing circuit elements having inductance components, such as reactors. Alternatively, inductance values $L_1$ and $L_2$ may be adjusted using the parasitic inductances of the wires by varying the wire lengths of current paths 10 and 20.

Figure 2:
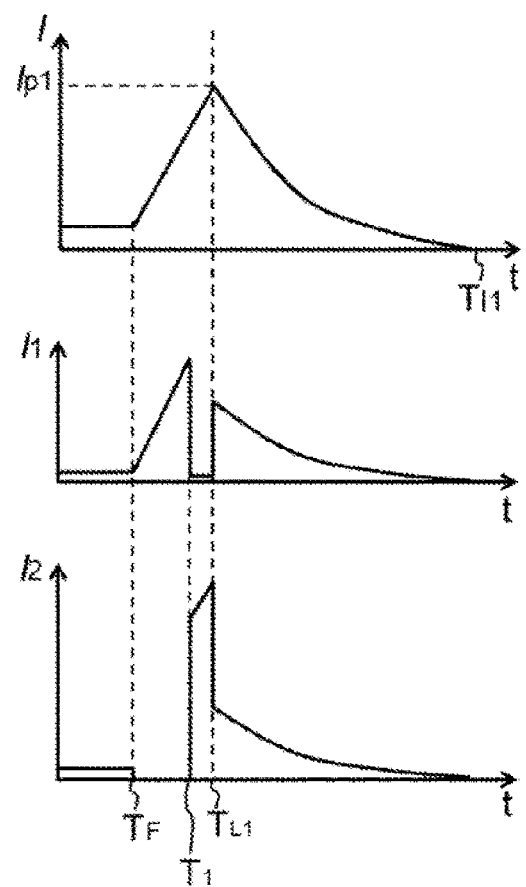
FIG. 2 shows the time dependence of the current through the DC interrupting device in embodiment 1 of the present invention.
Figure 2:
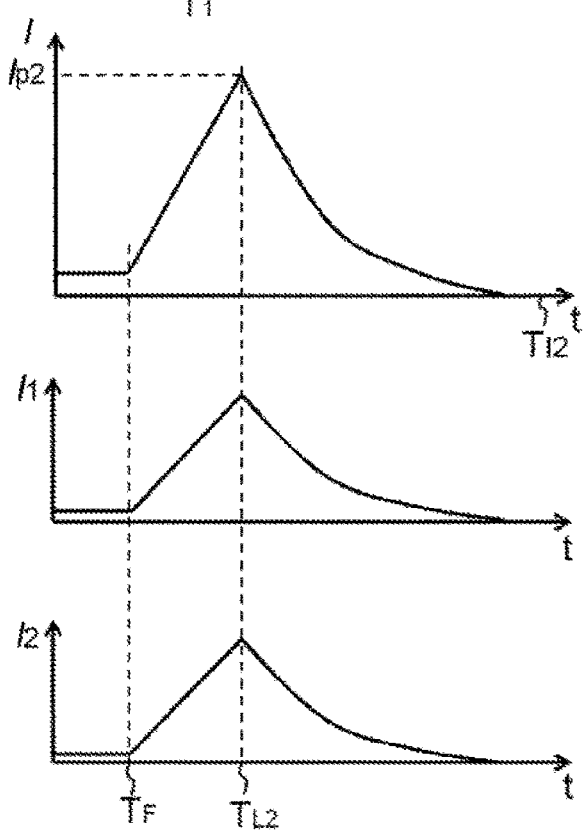

FIG. 2 shows the time dependence of the current through the DC interrupting device in embodiment 1 of the present invention. The vertical axes in FIG. 2 represent total current I, current $I_1$, and current $I_2$. The horizontal axes represent time t. The three graphs in FIG. 2(a) respectively show the time dependence of total current I, current $I_1$, and current $I_2$ in the interruption operation of DC interrupting device 100 at the time of occurrence of fault current.

In FIG. 2(a) and FIG. 2(b), the three horizontal axes share the same time. For example, a fault occurrence time $T_F$ indicates the same time in the graphs of total current I, current $I_1$, and current $I_2$. Also, any point on each dashed line extending in parallel to the vertical axes indicate the same time. For example, any point on the dashed line at the position of melting completion time $T_{L1}$ in FIG. 2(a) indicates the same time in the three graphs of FIG. 2(a).

FIG. 2(b) shows the time dependence of the current of a DC interrupting device 101. DC interrupting device 101 is a device for comparison with DC interrupting device 100 in the description, and is not a DC interrupting device according to an embodiment of the present invention. In DC interrupting device 101, inductance values $L_1$ and $L_2$ are set to the same value. In other respects, DC interrupting device 101 has the same configuration as DC interrupting device 100.

Using FIG. 2(a) and FIG. 2(b), the operation and the advantageous effects of DC interrupting device 100 in embodiment 1 are described.

The time when no fault current is generated is defined as "normal times". In FIG. 2(a), the time period before fault occurrence time $T_F$ at which a fault current occurs corresponds to "normal times". At normal times, total current I through DC interrupting device 100, current $I_1$, and current $I_2$ are not time-dependent. Therefore, a voltage drop due to inductance components $IC_1$ and $IC_2$ does not occur.

As described above, since resistance values $R_1$ and $R_2$ are set to the same value, currents $I_1$ and $I_2$ are equal at normal times. Specifically, at normal times, currents $I_1$ and $I_2$ are half the total current I. Resistance values $R_1$ and $R_2$ can be equalized by, for example, adjusting the length and diameter of the cables.

In DC interrupting device 100, at normal times, total current I branches into current $I_1$ and current $I_2$, so that the current through each of current-limiting fuses $H_1$ and $H_2$ is half the total current I. Accordingly, compared with a DC interrupting device where one current path has only one current-limiting fuse, DC interrupting device 100 can suppress the thermal deterioration of the fusible portions of fuse elements at normal times, and can also suppress the occurrence of erroneous melting of the fuse elements.

In the power grid provided with DC interrupting device 100, if a fault occurs at fault occurrence time $T_F$ in FIG. 2(a), total current I starts to increase immediately after fault occurrence time $T_F$. Since inductance value $L_2$ is higher than inductance value $L_1$, current path 10 is higher in impedance than current path 20.

Due to this impedance difference, the increase in total current I causes an increase in current $I_1$ and a decrease in current $I_2$. Resistance values $R_1$ and $R_2$ are set to low enough relative to the impedance of current path 10 at the time of occurrence of fault current, and thus do not affect the branch ratio between current $I_1$ and current $I_2$ of immediately after the occurrence of fault current.

The branch ratio between current path 10 and current path 20 at the time of occurrence of fault current is close to the ratio between inductance value $L_1$ and inductance value $L_2$.

Each current-limiting fuse has the properties as follows: each current-limiting fuse melts when an integration value exceeds a threshold value, where the integration value is obtained by integrating the value of current through the current-limiting fuse with respect to time for an integration interval, the integration interval being a time period during which the value of current through the current-limiting fuse exceeds the rated current. With such properties, current-limiting fuse $H_1$ melts in advance of current-limiting fuse $H_2$.

As shown in FIG. 2(a), the time at which current-limiting fuse Hi melts is denoted by melting time $T_1$. Current $I_2$ then increases, which causes current-limiting fuse $H_2$ to melt. The time at which current-limiting fuse $H_2$ melts is denoted by melting completion time $T_{L1}$. Total current I at melting completion time $T_{L1}$ is denoted by interruption current $I_{p1}$. Interruption current $I_{p1}$ is the value of maximum current that flows through DC interrupting device 100 during the time period from the occurrence of fault to the completion of interruption.

At and after melting completion time $T_{L1}$, the current continues due to the generation of electric arc at current-limiting fuses $H_1$ and $H_2$ until interruption time when the interruption completes with the stop of the electric arc. Such is the operation from the occurrence of fault current to the interruption in DC interrupting device 100.

Next, the operation of DC interrupting device 101 at the time of occurrence of fault current is described. For the description of DC interrupting device 101 shown in FIG. 2(b), the same names and reference sings are used as those of the elements of DC interrupting device 100. If a fault current occurs at fault occurrence time $T_F$ in FIG. 2(b), total current I starts to increase immediately after fault occurrence time $T_F$.

DC interrupting device 101, where inductance values $L_1$ and $L_2$ are roughly equal, have roughly equal currents $I_1$ and $I_2$ at the time of occurrence of fault current. Therefore, current-limiting fuses $H_1$ and $H_2$ melt roughly at the same time. The melting time is denoted by melting completion time $T_{L2}$. Total current I through DC interrupting device 101 at melting completion time $T_{L2}$ is denoted by interruption current $I_{p2}$.

At and after melting completion time $T_{L2}$, the current continues due to the generation of electric arc at one or both of current-limiting fuses $H_1$ and $H_2$ until interruption time $T_{L2}$, when the interruption completes with the stop of the electric arc. Such is the operation from the occurrence of fault to the interruption in DC interrupting device 101.

The characteristics of DC interrupting device 100 will now be described by comparing DC interrupting device 100 with DC interrupting device 101. Firstly, the time period between fault occurrence time $T_F$ and melting completion time $T_{L2}$ is longer than the time period between fault occurrence time $T_F$ and melting completion time $T_{L1}$.

Specifically, in DC interrupting device 100, the two current paths have different inductance values at the time of occurrence of fault. Accordingly, the current is not distributed but concentrated on each current path in succession. This can shorten the time period required for each current-limiting fuse to melt, thereby shortening the time period required for completing the melting of all the current-limiting fuses.

Further, DC interrupting device 100, which performs current-limiting in two steps, can make interruption current $I_{p1}$ lower than interruption current $I_{p2}$. In other words, DC interrupting device 100 in embodiment 1 can advantageously reduce the maximum value of fault current flowing at the time of current-limiting, as compared with DC interrupting device 101.

Further, DC interrupting device 100 can shorten the time period before the production of current zero in total current I through DC interrupting device 100 after the occurrence of fault, as compared with DC interrupting device 101. In other words, the time period between fault occurrence time $T_F$ and interruption time $T_{11}$ is shorter than the time period between fault occurrence time $T_F$ and interruption time $T_{12}$.

As described above, at normal times, DC interrupting device 100 branches the current equally, which is achieved by the plurality of current paths having equal resistance components. Therefore, DC interrupting device 100 can suppress the progress of deterioration of the current-limiting fuses.

Further, DC interrupting device 100 in embodiment 1 concentrates a current on each current path in succession for melting each current-limiting fuse. Thus, as compared with a DC interrupting device in which inductance values $L_1$ and $L_2$ are equal, DC interrupting device 100 in embodiment 1 can shorten the time period required for interruption or limitation of a fault current.

In other words, DC interrupting device 100 can advantageously shorten the time period from fault occurrence time $T_F$ to melting completion time $T_{L1}$ at which the current limiting on the fault current starts. Also, DC interrupting device 100 can reduce interruption current $I_{p1}$. This can advantageously reduce the damage to the devices connected to the fault site via the DC interrupting device, or can reduce the damage to the power grid.

Thus, the DC interrupting device in embodiment 1 of the present invention does not easily cause erroneous melting of the current-limiting fuses at normal times, and can also deliver good current-limiting performance at the time of occurrence of fault current.

Figure 3:
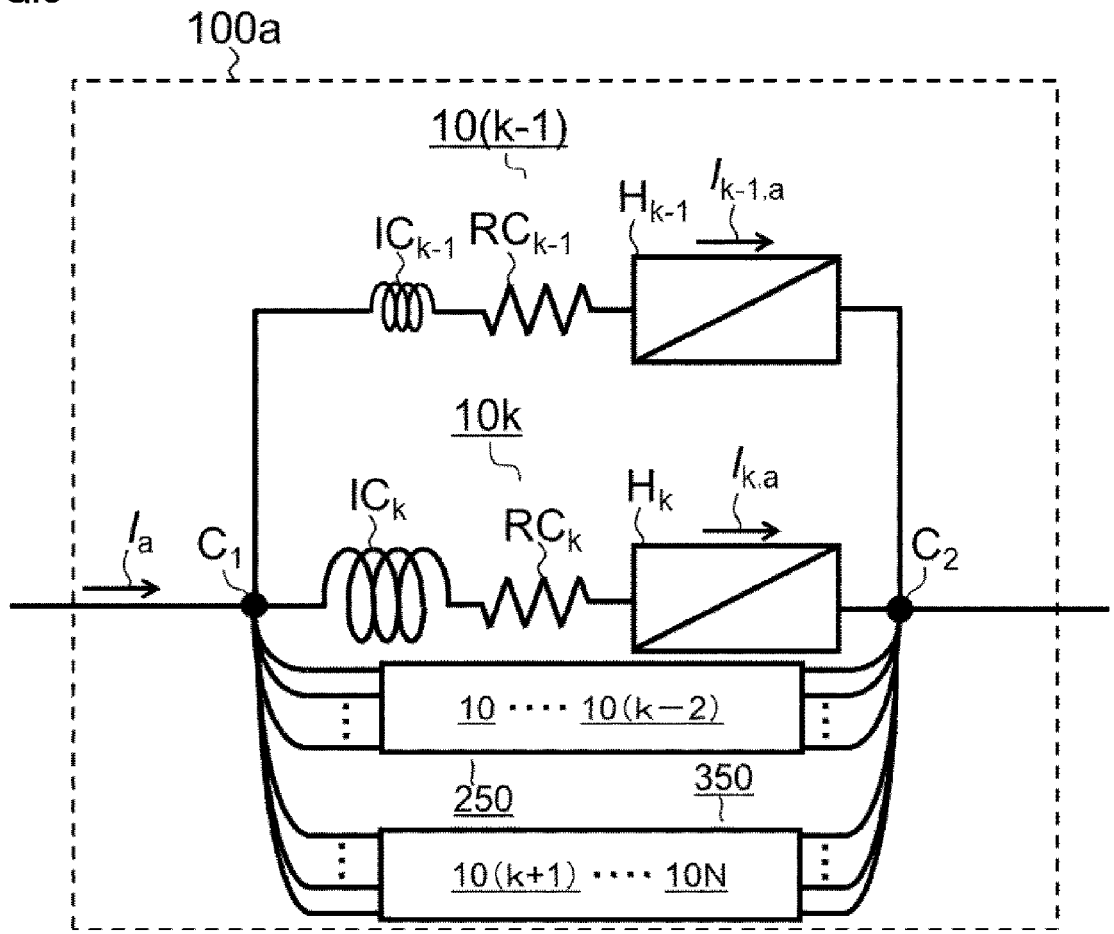
FIG. 3 is a configuration diagram of a DC interrupting device including three or more current paths in embodiment 1 of the present invention.

While DC interrupting device 100 in FIG. 1 includes two current-limiting fuses connected in parallel, it may be modified into a DC interrupting device 100a that includes three or more current-limiting fuses connected in parallel, so as to more reliably suppress the deterioration of the fusible portions at normal times and deliver better current-limiting performance. FIG. 3 is a configuration diagram of a DC interrupting device including three or more current paths in embodiment 1 of the present invention.

With reference to FIG. 3, the configuration and operation of DC interrupting device 100a including N (N is three or more) current paths are described. The description of the parts having the same configuration as those of FIG. 1 is not repeated. DC interrupting device 100a includes current paths 10 to 10N. Current paths 10 to 10N are connected in parallel to one another at connection points $C_1$ and $C_2$.

While DC interrupting device 100a includes first to Nth current paths connected at connection points $C_1$ and $C_2$, this is not a limitation. The advantageous effects of the present invention can be obtained if the first to Nth current paths are connected in parallel and the relation of inductance components and the relation of resistance components among the current paths are defined as in DC interrupting device 100a.

In FIG. 3, current path 10(k−1) and current path 10k are shown individually, among the plurality of current paths. On the other hand, current paths 10 to 10(k−2) are collectively shown as a parallel current path 250. Here, k is not less than two and not more than N. In the following description, k denotes any number not less than two and not more than N.

Also, current paths 10(k+1) to 10N are collectively shown as a parallel current path 350. In the case of k=2, parallel current path 250 is not included. In the case of k=3, parallel current path 250 is constituted of only current path 10. In the case of k=N−1, parallel current path 350 is constituted of only current path 10N. In the case of k=N, parallel current path 350 is not included.

Current path 10(k−1) has inductance component $IC_{k-1}$ and resistance component $RC_{k-1}$. Current path 10k has inductance component $IC_k$ and resistance component $RC_k$.

As in DC interrupting device 100, resistance values $R_k$ and $R_{k-1}$ are equal, and inductance value $L_k$ is higher than inductance value $L_{k-1}$.

Current paths 10(k−1) and 10k respectively include current-limiting fuses $H_{k-1}$ and $H_k$. The current through the entire DC interrupting device 100a is denoted by total current $I_a$. The current through current path 10(k−1) is denoted by current $I_{k-1, a}$. The current through current path 10k is denoted by current $I_{k, a}$.

The operation of DC interrupting device 100a at the time of occurrence of fault current will now be described. Suppose a situation in which a fault current has occurred and all the current paths included in parallel current path 250 have melted. In this case, the current can flow only through current path 10(k−1), current path 10k, and parallel current path 350, except for currents caused by electric arcs.

As described above, inductance value $L_k$ is higher than inductance value $L_{k-1}$. More preferably, the inductance value of the inductance component of the current path constituted of current path 10k and parallel current path 350 is higher than inductance value $L_{k-1}$. With such a configuration, the fault current concentrates on current path 10(k−1) and thus can melt current-limiting fuse $H_{k-1}$ in a short time period.

After that, as with current path 10(k−1), the fault current concentrates on current path 10k and melts current-limiting fuse $H_k$. In this way, the fault current concentrates on each of the first to Nth current paths in succession and melts each current-limiting fuse, thus allowing completion of current limiting in a short time period.

When a current zero is produced at the completion of the current limiting, with no recurrence of electric arc at any current-limiting fuse, the interruption of the fault current is completed. Such is the operation of DC interrupting device 100a in embodiment 1.

DC interrupting device 100a in embodiment 1, which has three or more current-limiting fuses and current paths, can reduce the value of current flowing through each current-limiting fuse at normal times, as compared with the case of two current paths. Therefore, erroneous melting is less likely to occur than in the case of two current paths.

If the fusible portions are smaller in wire diameter than those in the case of two current paths, better current-limiting performance can be delivered, while the likelihood of erroneous melting is maintained at the same level as with two current paths.

With three or more current paths connected in parallel, all the current paths have different inductance values. This allows the current to concentrate on each current path at staggered times, thereby shortening the time period required for each current-limiting fuse to melt.

More preferably, with respect to any k not less than two and not more than N, the inductance value of current path 10(k−1) is set to lower than the inductance value of the parallel circuit constituted of current paths 10k to 10N. This allows the current to concentrate on each current path at staggered times, thereby shortening the time period required for each current-limiting fuse to melt.

DC interrupting device 100 including two or more current-limiting fuses is configured as follows. DC interrupting device 100 includes a (k−1)th current path including a (k−1)th current-limiting fuse, where k is an integer of not less than two and not more than N, and N is an integer of not less than two. DC interrupting device 100 further includes a kth current path connected in parallel to the (k−1)th current path and including a kth current-limiting fuse. The inductance value of the inductance component of the kth current path is higher than the inductance value of the inductance component of the (k−1)th current path.

Further, the first to Nth current paths are equal in resistance component. The current paths, equal in resistance component, allow an equal current to flow through the current paths at normal times. Accordingly, the value of current through each current path can be minimized. This can reduce the deterioration of the current-limiting fuses at normal times and also reduce the occurrence of erroneous melting of the current-limiting fuses.

The inductance value of the inductance component of the parallel current path constituted of the kth to Nth current paths may be twice or more as high as the inductance value of the inductance component of the (k−1)th current path, where k is an integer of not less than two and not more than N, and N is an integer of not less than two. In this case, the following advantageous effects are provided.

When the first to (k−2)th current paths melt, the impedance value of the (k−1)th current path is half or less the impedance value of the parallel current path constituted of the kth to Nth current paths. Therefore, the current concentrates on the kth current path, thereby shortening the time required for completing the melting of all the current paths.

As described above, the DC interrupting device in the present embodiment includes a plurality of current paths, among which a current is distributed at normal times. The current paths, which have different inductance components, produce different impedances at the time of occurrence of fault current.

Accordingly, the current concentrates on each current path in succession, in ascending order according to its inductance component. Thus, the interruption current can be suppressed. Note that the interruption current is the maximum value of current flowing through the DC interrupting device during the time period from the occurrence of fault to the completion of interruption. Further, the time period can be shortened from the occurrence of fault current to the completion of the current interruption.

Thus, DC interrupting device in the present embodiment can advantageously reduce the occurrence of erroneous melting of the current-limiting fuses at normal times with no fault current, and can also deliver good current-limiting performance at the time of occurrence of fault current.

Embodiment 2

Figure 4:
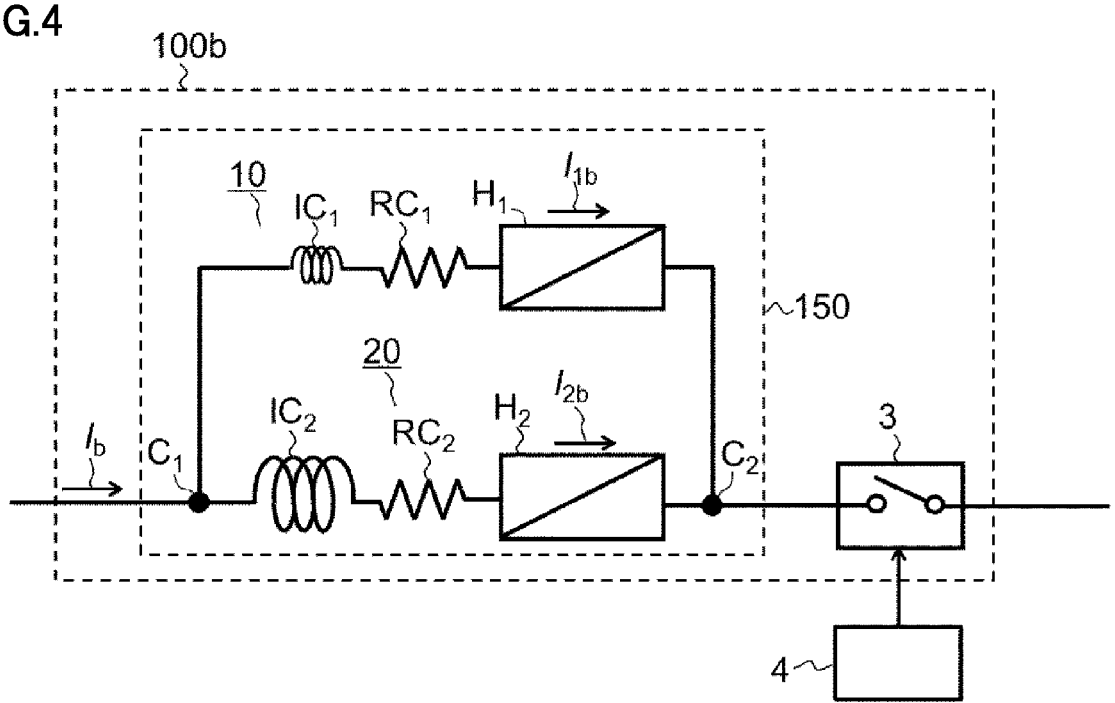
FIG. 4 shows a configuration of a DC interrupting device in embodiment 2 of the present invention.

A DC interrupting device 100b in embodiment 2 includes a circuit breaker 3 in addition to and connected in series to DC interrupting device 100 in embodiment 1. FIG. 4 shows a configuration of a DC interrupting device in embodiment 2 of the present invention. The layouts and ranges of current paths 10 and 20 are the same as those of FIG. 1. A parallel current path constituted of current paths 10 and 20 is denoted by a parallel current path 150.

The same parts as those of DC interrupting device 100 shown in FIG. 1 in embodiment 1 are denoted by the same reference signs, and the detailed description thereof is not repeated. The current through current path 10 is denoted by current $I_{1b}$, and the current through current path 20 is denoted by current $I_{2b}$. The current through the entire DC interrupting device 100b in embodiment 2 is denoted by total current $I_b$. DC interrupting device 100b additionally includes circuit breaker 3.

DC interrupting device 100b is obtained by connecting circuit breaker 3 in series to DC interrupting device 100 that has two current paths. However, circuit breaker 3 may be connected in series to DC interrupting device 100a that has three or more current paths. Such a DC interrupting device can also provide the advantageous effects of the present invention as with DC interrupting device 100b.

The operation of DC interrupting device 100b will now be described. When a fault current occurs, an overcurrent detection device 4 detects the fault current and inputs a circuit-breaker opening signal to circuit breaker 3. Upon receiving the circuit-breaker opening signal, circuit breaker 3 opens its contacts.

When an arc current between the contacts of the circuit breaker is decreased, the arc temperature is decreased, which causes an increase in resistance between the contacts of the circuit breaker, resulting in interruption of the current (current chopping phenomenon). The current value at which the current chopping phenomenon occurs, referred to as a chopping current value, differs depending on the circuit breaker.

In parallel with the contact-opening operation of circuit breaker 3, current-limiting fuses $H_1$ and $H_2$ melt in succession due to the fault current, thereby limiting total current $I_b$. Total current $I_b$, when dropped to the chopping current value of circuit breaker 3, is interrupted due to the resistance between the contacts of circuit breaker 3. Such is the operation of DC interrupting device 100b at the time of occurrence of fault current.

When current-limiting fuses $H_1$ and $H_2$ melt, a current zero may be produced in total current $I_b$. The production of current zero, however, is not essential if circuit breaker 3 can complete the interruption with total current $I_b$ dropping to the chopping current value or lower.

In a system in which a high voltage of several kV or more is generated between the terminals of each current-limiting fuse, an electric arc is often generated between the terminals. The electric arc may allow the current to continue, even after the current limiting and the current zero generation using the current-limiting fuses. Therefore, it can be difficult to interrupt the current using current-limiting fuses alone.

According to DC interrupting device 100b, circuit breaker 3 is connected in series to parallel current path 150. Thus, DC interrupting device 100b can interrupt the direct current using circuit breaker 3 after limiting the current by melting the current-limiting fuses. In this way, DC interrupting device 100b can interrupt a fault current in an electrical circuit with a high-voltage that would be difficult to interrupt using current-limiting fuses alone.

DC interrupting device 100b that can interrupt a fault current is designed as follows, for example. First, a fault current that can occur in the power grid provided with DC interrupting device 100b is estimated with respect to its current value, current waveform and the like, including the safety factor. Then, based on the estimated fault current, the current value after the current limiting via current-limiting fuses $H_1$ and $H_2$ is predicted.

Further, circuit breaker 3 and current-limiting fuses $H_1$ and $H_2$ are designed or selected from among commercially available products so that the predicted current value after the current limiting will be equal to or lower than the chopping current value. Thus, DC interrupting device 100b that can interrupt a fault current can be designed, including the safety factor.

Examples of the types of electric arcs which cause the current chopping phenomenon include gas arcs and vacuum arcs. The insulating medium or extinguishing medium of circuit breaker 3 can be selected in accordance with the properties desired for the circuit breaker. A gas can be selected as the insulating medium or extinguishing medium. Depending on the properties desired for the circuit breaker, circuit breaker 3 may be a vacuum circuit breaker.

As described above, DC interrupting device 100b in embodiment 2 does not easily cause erroneous melting of the current-limiting fuses at normal times with no fault current, and can also deliver good current-limiting performance at the time of occurrence of fault current.

Further, according to DC interrupting device 100b in embodiment 2, circuit breaker 3 is connected in series to parallel current path 150. Thus, DC interrupting device 100b can interrupt the current using circuit breaker 3 after limiting the current by melting the current-limiting fuses. In this way, the DC interrupting device 100b can interrupt a fault current generating a voltage of several kV or more between the terminals that would be difficult to interrupt using current-limiting fuses alone.

Embodiment 3

Figure 5:
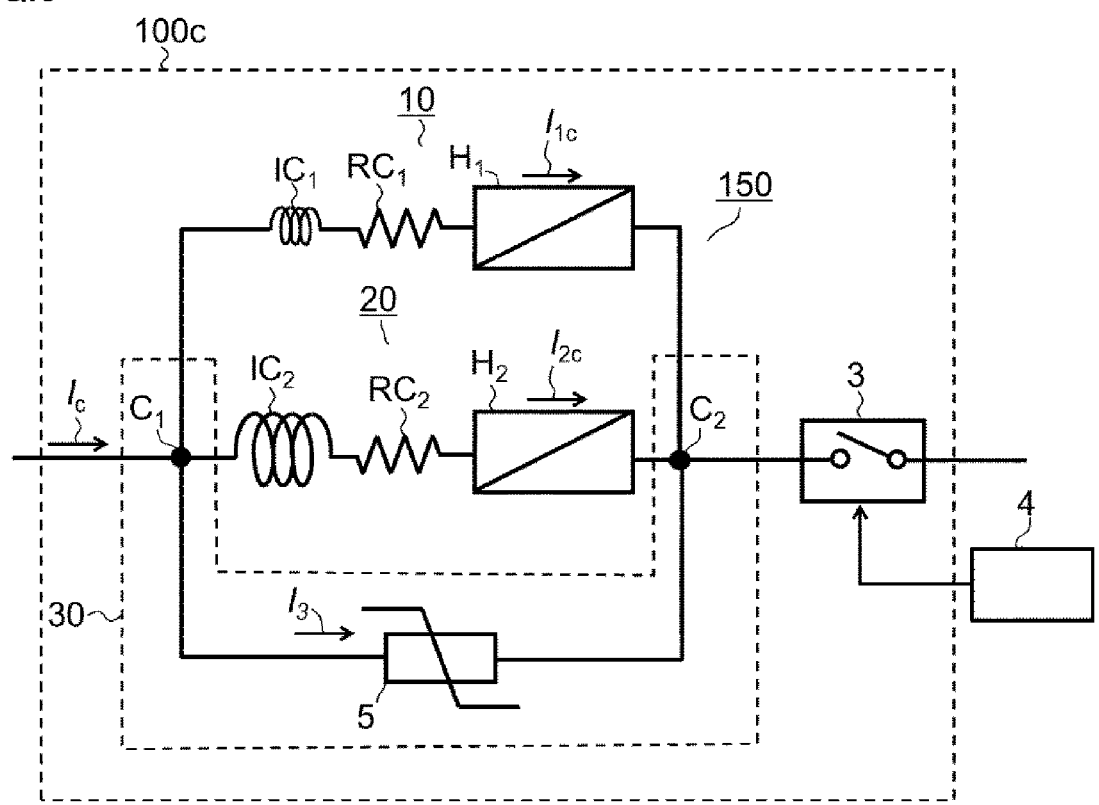
FIG. 5 shows a configuration of a DC interrupting device in embodiment 3 of the present invention.

A DC interrupting device 100c in embodiment 3 further includes a lightning arrester 5 connected in parallel to parallel current path 150, in addition to DC interrupting device 100b described in embodiment 2. FIG. 5 shows a configuration of a DC interrupting device in embodiment 3 of the present invention. The same parts as those of DC interrupting device 100b shown in FIG. 4 in embodiment 2 are denoted by the same reference signs, and the detailed description thereof is not repeated.

Lightning arrester 5 is connected in parallel to parallel current path 150 at connection points $C_1$ and $C_2$. The current path including lightning arrester 5 and connecting between connection points $C_1$ and $C_2$ is referred to as a current path 30. The current through the entire DC interrupting device 100c is denoted by total current $I_c$.

The current through current path 10 is denoted by current $I_{1c}$, and the current through current path 20 is denoted by current $I_{2c}$. The current through current path 30 is denoted by current $I_3$.

While lightning arrester 5 is connected in parallel to parallel current path 150 at connection points $C_1$ and $C_2$ in embodiment 3, this is not a limitation of the present invention. The advantageous effects of the present invention can be obtained if lightning arrester 5 is connected in parallel to parallel current path 150.

Further, any other configuration may be employed to obtain the same advantageous effects, as long as the voltage between the terminals of current-limiting fuse $H_1$ or $H_2$ is applied across lightning arrester 5. As described in embodiment 2, at the time of occurrence of fault current, current-limiting fuses $H_1$ and $H_2$ melt in succession to limit the current, and then circuit breaker 3 interrupts the current.

At this time, a current-limiting fuse having a higher voltage between its terminals when melted can shorten the time period before the start of current limiting after the occurrence of fault current, and thus can shorten the time period before the production of current zero after the occurrence of fault current. In other words, a current-limiting fuse having a higher voltage between its terminals delivers better current-limiting performance.

When current limiting is performed using parallel current path 150, the voltage between the terminals of current-limiting fuse $H_1$ or $H_2$ may exceed the voltage limit of the power grid. This may damage component devices of the power grid. Examples of the component devices of the power grid include an AC-DC converter (a device that converts between AC and DC) and a DC-DC converter (a device that converts DC voltages).

During the current-limiting operation using parallel current path 150, when the voltage between the terminals of current-limiting fuse $H_1$ or $H_2$ exceeds the discharge starting voltage, current $I_3$ flows through lightning arrester 5. Current $I_3$ flowing through lightning arrester 5 reduces the voltage between the terminals of current-limiting fuse $H_1$ or $H_2$.

As described above, DC interrupting device 100c does not easily cause erroneous melting of the current-limiting fuses at normal times with no fault current, and can also deliver good current-limiting performance at the time of occurrence of fault current.

Further, according to DC interrupting device 100c, circuit breaker 3 is connected in series to parallel current path 150. Thus, DC interrupting device 100c can interrupt the direct current by the voltage between the terminals of circuit breaker 3, after limiting the current by melting the current-limiting fuses included in parallel current path 150. In this way, DC interrupting device 100c can interrupt a direct current with a several kV or more that would be difficult to interrupt using high voltage fuses alone.

Further, DC interrupting device 100c, which includes lightning arrester 5, allows a current to flow through lightning arrester 5 when the voltage between the terminals of current-limiting fuse $H_1$ or $H_2$ exceeds the discharge starting voltage. Thus, the voltage between the terminals of current-limiting fuse $H_1$ or $H_2$ can be reduced.

The operation of lightning arrester 5 can reduce the voltage between the terminals of current-limiting fuse $H_1$ or $H_2$ to equal to or lower than the discharge starting voltage, thus advantageously preventing damage to the devices included in the power grid.

Embodiment 4

Figure 6:
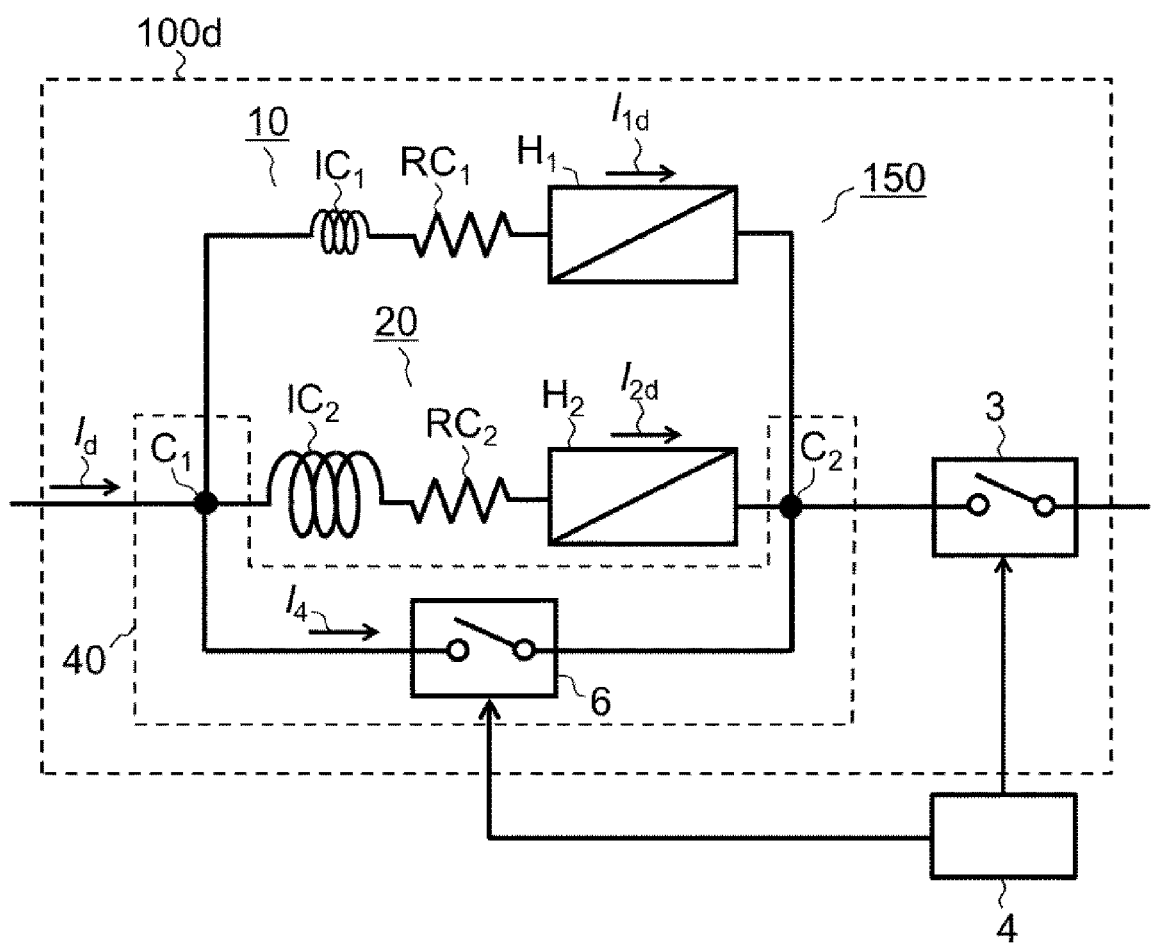
FIG. 6 shows a configuration of a DC interrupting device in embodiment 4 of the present invention.

A DC interrupting device in embodiment 4 includes a switch 6 in addition to the construction described in embodiment 2. FIG. 6 shows a configuration of a DC interrupting device in embodiment 4 of the present invention. The same parts as those of DC interrupting device 100b shown in FIG. 4 in embodiment 2 are denoted by the same reference signs, and the detailed description thereof is not repeated.

DC interrupting device 100d in embodiment 4 has the construction described in embodiment 2. Further, switch 6 is connected in parallel to parallel current path 150 at connection points $C_1$ and $C_2$. The current path including switch 6 and connecting between connection points $C_1$ and $C_2$ is referred to as a current path 40. The current through current path 40 is denoted by $I_4$.

While DC interrupting device 100d includes circuit breaker 3, the advantageous effects of the present invention can be obtained without circuit breaker 3. The advantageous effects of the present invention can also be obtained if DC interrupting device 100d additionally includes lightning arrester 5 connected in parallel to parallel current path 150, as in DC interrupting device 100c.

Figure 7:
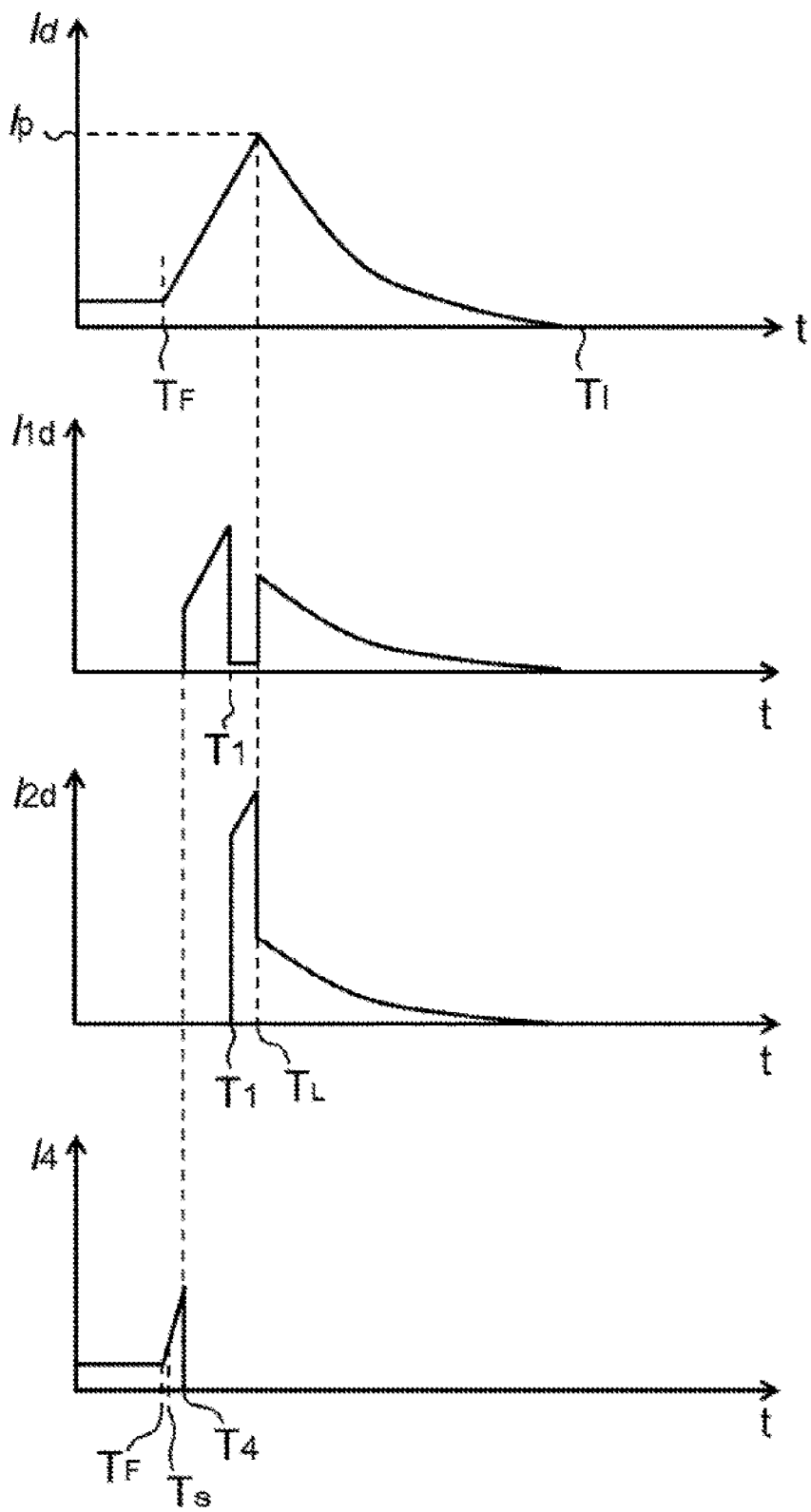
FIG. 7 shows the time dependence of the current through the DC interrupting device in embodiment 4 of the present invention.

The current through DC interrupting device 100d is denoted by total current Id. The current through current path 10 is denoted by $I_{1d}$, and the current through current path 20 is denoted by $I_{2d}$. FIG. 7 shows the time dependence of the current through the DC interrupting device in embodiment 4 of the present invention. FIG. 7 shows temporal waveforms of the currents through current paths 10, 20, and 40 when a fault current occurs.

The reference signs shown in FIG. 7 will now be described. $T_F$ denotes the fault occurrence time at which a fault current occurs in the power grid. $T_S$ denotes the contact-opening starting time at which the switch starts opening its contacts. $T_4$ denotes the contact-disconnection time, i.e., the instant at which the contacts of switch 6 are physically disconnected. $T_1$ denotes the melting time at which current-limiting fuse $H_1$ melts.

$T_L$ denotes the melting completion time at which current-limiting fuse $H_2$ melts. $I_P$ denotes the interruption current, which is the current at melting completion time $T_L$. In FIG. 7, the three horizontal axes share the same time. For example, fault occurrence time $T_F$ indicates the same time in the graphs of total current $I_d$, current $I_{1d}$, and current $I_{2d}$. Also, any point on each dashed line extending in parallel to the vertical axes indicate the same time.

With reference to FIGS. 6 and 7 in combination, the operation of DC interrupting device 100d is described. At normal times switch 6 is closed, during which total current $I_d$ and current $I_4$ are roughly equal, since the resistance component of parallel current path 150 is set to higher than the resistance component of current path 40.

Accordingly, currents $I_{1d}$ and $I_{2d}$ are minimized at normal times, thereby significantly suppressing the progress of thermal deterioration of the fusible portions of current-limiting fuses $H_1$ and $H_2$.

Switch 6 includes a pair of contacts connectable and disconnectable and configured to open in response to a contact-opening instruction signal 2. A contact-opening instruction signal outputted to circuit breaker 3 is denoted by contact-opening instruction signal 1, and a contact-opening instruction signal outputted to switch 6 is denoted by contact-opening instruction signal 2. Contact-opening instruction signals 1 and 2 may be simultaneously generated, or may be staggered after the detection of a fault current.

In the power grid provided with DC interrupting device 100d, if a fault current occurs at fault occurrence time $T_F$, total current $I_d$ increases. Overcurrent detection device 4 detects the fault current and outputs contact-opening instruction signal 2 to switch 6. Upon receiving contact-opening instruction signal 2, switch 6 starts disconnecting the pair of contacts at contact-opening starting time $T_S$.

When switch 6 starts opening the contacts, the electrical resistance between the contacts of switch 6 increases. The reasons for the resistance increase are, for example, the decrease in contact area between the contacts of switch 6, the decrease in contact pressure between the contacts of switch 6, and the fusion of the contacts of switch 6. After that, the two contacts are physically disconnected at contact-disconnection time $T_4$.

In DC interrupting device 100d, current 14 at contact-disconnection time $T_4$ is set to lower than the chopping current value of switch 6. Accordingly, switch 6 is chopped at contact-disconnection time $T_4$.

As described above, during the time period from contact-opening starting time $T_S$ to contact-disconnection time $T_4$, the resistance between the contacts of switch 6 increases. As described in embodiment 1, inductance value $L_2$ is set to higher than inductance value $L_1$, and the electrical resistance of current path 40 is set to higher than resistance value $R_1$.

As described above, current $I_4$ at contact-disconnection time $T_4$ is set to equal to or lower than the chopping current value, which is the maximum current value that allows switch 6 to be chopped. Current $I_4$ at contact-disconnection time $T_4$ can be adjusted to equal to or lower than the chopping current value by adjusting the magnitude relation between the resistance between the contacts of switch 6 and resistance component $RC_1$ of current path 10.

The chopping current value differs depending on the switch. Current $I_4$ at contact-disconnection time $T_4$ can be adjusted to equal to or lower than the chopping current value by calculation or test, in consideration of the specifications of the switch, the properties of a fault current that can be generated in the power grid, and the like.

At contact-disconnection time $T_4$, current $I_4$ is reduced to zero and the current through current path 40 is commutated to current path 10. This suppresses the generation of electric arc between the contacts of switch 6. Therefore, DC interrupting device 100*d* can not only suppress the progress of thermal deterioration of the fuse elements at normal times, but also interrupt the current quickly.

When the current through current path 40 is commutated to parallel current path 150, there is still a possibility of an electric arc between the contacts of switch 6. That would deteriorate the insulation performance between the contacts of switch 6, and the deteriorated insulation performance continues for a certain time period. The deteriorated insulation performance between the contacts refers to a state in which an electric arc is likely to occur, that is, a state in which an electric arc can occur between the contacts even with a low voltage between the contacts.

If the contacts of switch 6, with a high likelihood of electric arc, are applied with a voltage generated in parallel current path 150, an electric arc may recur between the contacts of switch 6, which may allow a fault current to continue. The voltage generated in parallel current path 150 refers to a voltage generated across current-limiting fuse $H_1$ at melting time $T_1$, or a voltage generated across current-limiting fuses $H_1$ and $H_2$ at melting completion time $T_L$.

In DC interrupting device 100*d*, the electrical resistance between the terminals of switch 6 is set to much higher than resistance value $R_1$, and current $I_4$ at contact-disconnection time $T_4$ is set to equal to or lower than the maximum chopping current value. Therefore, the recurrence of electric arc between the contacts of switch 6 can be suppressed.

As described above, DC interrupting device 100*d* does not easily cause erroneous melting of the current-limiting fuses at normal times with no fault current, and can also deliver good current-limiting performance at the time of occurrence of fault current.

Further, according to DC interrupting device 100*d*, circuit breaker 3 is connected in series to parallel current path 150. Thus, DC interrupting device 100*d* can interrupt the direct current by the potential difference between the terminals of circuit breaker 3, after limiting the current by melting the current-limiting fuses included in parallel current path 150. In this way, DC interrupting device 100*d* can interrupt a direct current with a several kV or more that would be difficult to interrupt using high voltage fuses alone.

Further, DC interrupting device 100*d* in embodiment 4, which includes switch 6 connected in parallel to parallel current path 150, can further suppress the current through the current-limiting fuses at normal times, thereby further suppressing the deterioration of the current-limiting fuses.

Further, in DC interrupting device 100*d*, current 14 at contact-disconnection time $T_4$ is set to lower than the chopping current value of switch 6 by adjusting the magnitude relation between the resistance between the terminals of switch 6 and resistance value $R_1$. This can suppress the occurrence of an electric arc between the contacts of switch 6 at the time of commutation to parallel current path 150, thereby suppressing the recurrence of electric arc between the contacts of switch 6 after the current limiting by parallel current path 150 is completed.

The embodiments described above can be applied in combination.

REFERENCE SIGNS LIST

10, 20 30, 40: current path; 100, 100*b*, 100*c*, 100*d*: DC interrupting device; 150, 250, 350: parallel current path; $C_1$, $C_2$: connection point; $H_1$, $H_2$, $H_{k-1}$, $H_k$: current-limiting fuse; I, $I_a$, $I_b$, $I_c$, $I_d$: total current; $I_1$, $I_{1a}$, $I_{k-1, a}$, $I_{k, a}$, $I_{1b}$, $I_{1c}$, $I_{1d}$, $I_2$, $I_{2a}$, $I_{2b}$, $I_{2c}$, $I_{2d}$: current; $IC_1$, $IC_2$: inductance component; $L_1$, $L_2$, $L_{k-1}$, $L_k$: inductance value; $R_1$, $R_2$, $R_{k-1}$, $R_k$: resistance value; $RC_1$, $RC_2$, $RC_{k-1}$, $RC_k$: resistance component.

The invention claimed is:

1. A DC interrupting device comprising:
   a (k−1)th current path including a (k−1)th current-limiting fuse, where k is an integer of not less than two and not more than N, and N is an integer of not less than two;
   a kth current path connected in parallel to the (k−1)th current path and including a kth current-limiting fuse, wherein an inductance value of an inductance component of the kth current path is higher than an inductance value of an inductance component of the (k−1)th current path; and
   a circuit breaker connected in series to a parallel current path constituted of the first to Nth current paths, the circuit breaker including a pair of contacts connectable and disconnectable.

2. The DC interrupting device according to claim 1, comprising:
   a first current path including a first current-limiting fuse; and
   a second current path connected in parallel to the first current-limiting fuse and including a second current-limiting fuse, wherein an inductance value of an inductance component of the second current path is higher than an inductance value of an inductance component of the first current path.

3. The DC interrupting device according to claim 1, wherein the first to Nth current paths have resistance components equal in resistance value.

4. The DC interrupting device according to claim 1, wherein an equivalent inductance value of inductance components of a parallel current path constituted of the kth to Nth current paths is higher than the inductance value of the inductance component of the (k−1)th current path.

5. The DC interrupting device according to claim 1, wherein an equivalent inductance value of inductance components of a parallel current path constituted of the kth to Nth current paths is twice or more as high as the inductance value of the inductance component of the (k−1)th current path.

6. The DC interrupting device according to claim 1, further comprising a lightning arrester connected in parallel to a parallel current path constituted of the first to Nth current paths.

7. The DC interrupting device according to claim 6, wherein
   when a voltage across the parallel current path is below a discharge starting voltage, the lightning arrester is kept insulated, and
   when the voltage across the parallel current path is above the discharge starting voltage, a current flows through the lightning arrester so that the voltage across the parallel current path is reduced to equal to or lower than the discharge starting voltage.

8. The DC interrupting device according to claim 1, further comprising a switch connected in parallel to a parallel current path constituted of the first to Nth current paths, the switch including a pair of contacts, wherein
   a chopping current value of the switch is higher than a current that flows through the switch at an instant when the contacts of the switch are disconnected.

9. A DC interrupting device comprising:
- a (k−1)th current path including a (k−1)th current-limiting fuse, where k is an integer of not less than two and not more than N, and N is an integer of not less than two;
- a kth current path connected in parallel to the (k−1)th current path and including a kth current-limiting fuse, wherein an inductance value of an inductance component of the kth current path is higher than an inductance value of an inductance component of the (k−1)th current path; and
- a switch connected in parallel to a parallel current path constituted of the first to Nth current paths, the switch including a pair of contacts, wherein
- a chopping current value of the switch is higher than a current that flows through the switch at an instant when the contacts of the switch are disconnected.

10. The DC interrupting device according to claim 9, further comprising a circuit breaker connected in series to a parallel current path constituted of the first to Nth current paths, the circuit breaker including a pair of contacts connectable and disconnectable.

\* \* \* \* \*